(12) United States Patent
Mitchell

(10) Patent No.: US 10,624,416 B2
(45) Date of Patent: Apr. 21, 2020

(54) FOOTWEAR AND THE MANUFACTURE THEREOF

(71) Applicant: VIONIC GROUP LLC, San Rafael, CA (US)

(72) Inventor: Terence Mitchell, San Rafael, CA (US)

(73) Assignee: VIONIC GROUP LLC, San Rafael, CA (US)

( * ) Notice: Subject to any disclaimer, the term of this patent is extended or adjusted under 35 U.S.C. 154(b) by 100 days.

(21) Appl. No.: 15/981,736

(22) Filed: May 16, 2018

(65) Prior Publication Data

US 2018/0343965 A1 Dec. 6, 2018

Related U.S. Application Data

(60) Provisional application No. 62/513,867, filed on Jun. 1, 2017.

(51) Int. Cl.
| | |
|---|---|
| A43B 7/14 | (2006.01) |
| A43B 7/22 | (2006.01) |
| A43B 7/32 | (2006.01) |
| A43B 13/38 | (2006.01) |
| A43B 13/40 | (2006.01) |
| A43B 1/14 | (2006.01) |

(Continued)

(52) U.S. Cl.
CPC ............... *A43B 7/149* (2013.01); *A43B 1/14* (2013.01); *A43B 7/141* (2013.01); *A43B 7/142* (2013.01); *A43B 7/144* (2013.01); *A43B 7/148* (2013.01); *A43B 7/1445* (2013.01); *A43B 7/22* (2013.01); *A43B 7/32* (2013.01); *A43B 13/383* (2013.01); *A43B 13/386* (2013.01); *A43B 13/40* (2013.01); *B32B 5/18* (2013.01); *B32B 7/02* (2013.01); *B32B 7/08* (2013.01); *B32B 7/12* (2013.01); *B32B 9/025* (2013.01); *B32B 27/065* (2013.01); *B32B 27/08* (2013.01); *B32B 27/306* (2013.01); *B32B 27/32* (2013.01); *B32B 2307/536* (2013.01); *B32B 2437/02* (2013.01)

(58) Field of Classification Search
CPC ......... A43B 7/1445; A43B 7/148; A43B 7/22; A43B 7/32; A43B 13/383; A43B 13/386; A43B 13/40
See application file for complete search history.

(56) References Cited

U.S. PATENT DOCUMENTS 4,793,078 A * 12/1988 Andrews ................ A43B 7/142
36/43
5,042,100 A 8/1991 Bar et al. .................. 12/142 N
(Continued)

OTHER PUBLICATIONS

Velasquez, A., "Tamaris Debuts New Insole Technology for Heel Lovers," Sourcing Journal, Jan. 30, 2017 (2 pgs).

*Primary Examiner* — Ted Kavanaugh
(74) *Attorney, Agent, or Firm* — Hayes Soloway P.C.

(57) ABSTRACT

An insole board for a high-heel shoe, said insole board includes a heel supporting area having a concave heel cup adapted to underlie a heel of the wearer, a medial arch support area adapted to underlie the arch of the wearer's foot and extending toeward of but short of the ball of the wearer's foot, and a forefoot area adapted to underlie the ball of the foot and forefoot of the wearer. The medial arch support area has a raised contour for supporting a portion of a sole of the wearer's foot underlying the wearer's arch, and the forefoot support area includes a hollow having a resiliently deformable material therein.

14 Claims, 2 Drawing Sheets

(51) Int. Cl.
  *B32B 5/18* (2006.01)
  *B32B 7/02* (2019.01)
  *B32B 7/12* (2006.01)
  *B32B 7/08* (2019.01)
  *B32B 27/32* (2006.01)
  *B32B 27/30* (2006.01)
  *B32B 27/06* (2006.01)
  *B32B 27/08* (2006.01)
  *B32B 9/02* (2006.01)

(56) References Cited

U.S. PATENT DOCUMENTS

| | | |
|---|---|---|
| 5,373,650 A | 12/1994 | Dananberg et al. ............... 36/92 |
| 5,782,015 A | 7/1998 | Dananberg .................... 36/34 R |
| 5,890,248 A | 4/1999 | Gee ............... 12/146 B |
| 6,318,002 B1 | 11/2001 | Ou ..................... 36/44 |
| 6,564,476 B1 | 5/2003 | Hernandez ................ 36/28 |
| D535,811 S | 1/2007 | Dananberg .................... D2/961 |
| 7,275,337 B2 | 10/2007 | Zanatta et al. .................... 36/44 |
| D555,341 S | 11/2007 | Vasyli et al. .................... D2/961 |
| 7,322,132 B2 | 1/2008 | Dananberg .................... 36/174 |
| D578,285 S | 10/2008 | Vasyli et al. .................... D2/961 |
| 7,594,346 B2 | 9/2009 | Dananberg .................... 36/174 |
| 7,814,688 B2 | 10/2010 | Dananberg .................... 36/174 |
| 7,962,986 B2 | 6/2011 | Dananberg ................. 12/142 N |
| 8,166,674 B2 | 5/2012 | Dananberg ..................... 36/43 |
| 8,776,399 B2 | 7/2014 | Tsai ................... 36/44 |
| 8,813,391 B1* | 8/2014 | Khaitan ................ A43B 21/00 36/28 |
| 8,840,825 B2 | 9/2014 | De Santis et al. .......................... B29C 45/0003 |
| 2001/0032397 A1 | 10/2001 | Ho ..................... 36/43 |
| 2004/0194352 A1 | 10/2004 | Campbell et al. .............. 36/174 |
| 2006/0123663 A1* | 6/2006 | Swensen ................ A43B 7/142 36/43 |
| 2008/0010857 A1 | 1/2008 | Green ............... 36/44 |
| 2008/0010861 A1* | 1/2008 | Kosmas ................ A43B 7/142 36/91 |
| 2009/0193683 A1* | 8/2009 | Igdari .................... A43B 7/142 36/91 |
| 2010/0064548 A1 | 3/2010 | Hansen ............................. 36/12 |
| 2011/0016747 A1 | 1/2011 | Bitton ............... 36/43 |
| 2012/0139156 A1 | 6/2012 | Zhang ......................... 264/254 |
| 2013/0185957 A1 | 7/2013 | Tsai ................... 36/44 |
| 2013/0192086 A1 | 8/2013 | Tawney et al. .......... A43B 9/00 |
| 2014/0026438 A1 | 1/2014 | Cortez et al. ......... A43B 13/181 |
| 2014/0075779 A1* | 3/2014 | Bruce ................... A43B 13/20 36/29 |
| 2014/0250722 A1* | 9/2014 | Lin ....................... A43B 7/142 36/44 |
| 2015/0208754 A1 | 7/2015 | De Santis et al. ........ A43B 1/14 |
| 2016/0000184 A1 | 1/2016 | Guadalajara ......... A43B 13/386 |
| 2016/0227879 A1* | 8/2016 | Haselaars ............. A43B 7/141 |
| 2016/0302518 A1 | 10/2016 | Amis et al. ............ A43B 13/12 |
| 2018/0064206 A1* | 3/2018 | Yildirim ................. A43B 1/00 |

* cited by examiner

FOOTWEAR AND THE MANUFACTURE THEREOF

CROSS REFERENCE TO RELATED APPLICATION

This application claims priority from U.S. Provisional Application Ser. No. 62/513,867, filed Jun. 1, 2017, the contents of which are incorporated herein by reference

FIELD OF THE INVENTION

The present disclosure relates generally to footwear products. The disclosure has particular utility in connection with high-heeled shoes, i.e. shoes having a heel of at least one inch, preferably two-three inches, and will be described in connection with such utility, although the footwear products are not so.

BACKGROUND OF THE INVENTION

Conventional high-heeled shoes are often uncomfortable and painful to wear while standing and walking. The position of the wearer's foot in the high-heeled shoe imposes a high load on the wearer's forefoot. High-heeled shoes also induce an unnatural walking style which may lead to various foot injuries.

Injuries resulting from wearing high-heeled shoes may include Morton's syndrome where a shortened first metatarsal results in excessive force on the metatarsal head of the second metatarsal; metatarsalgia where the metatarsals become irritated and inflamed due to an uneven weight distribution across the forefoot when it hits the ground; Hallux valgus where the big toe points toward the second toe, resulting in a protrusion at the metatarsal phalangeal joint of the first metatarsal; stress fractures which are small cracks in a bone, or a severe bruising within a bone, typically caused by overuse and repetitive activity; sesamoiditis where the sesamoids break or the tendons surrounding the sesamoids become irritated or inflamed, and neuromas due to nerve impingement.

SUMMARY OF THE INVENTION

The present disclosure provides improvements in footwear construction that overcomes the aforesaid and other disadvantages of the prior art by providing for a high-heeled shoe, a foot supporting surface having a combination of biomechanical contours and support areas of different densities. In one embodiment the disclosure provides a rigid insole board construction that includes a heel supporting area, having a concave heel cup adapted to underlie the heel of the wearer, and a domed or contoured medial arch support adapted to underlie between the highest point of the arch of the wearers foot and extending toe wards of but short of the ball of the wearer's foot, i.e., the padded portion of the sole of the foot between the arch and the toes, below the heads of the metatarsal bones. Additionally, the insole board has the support area adapted to underlie the area proximal of the metatarsals of the fore foot, which support area is made of a resiliently deformable material of reduced durometer as compared to the rest of the insole board. There is a fore foot area of the board to allow for a softer material insert to assist in comfort and flexibility of the fore foot.

In another embodiment of the disclosure an insole board for a high heel shoe comprises a relatively stiff injection molded piece, and includes a concave heel cup area adapted to underlie the heel of the wearer, wherein the heel cup area is padded or cushioned with a relatively soft material such as a polymer foam or gel; the medial arch support comprises a domed or contoured pad made of a firm but resiliently deformable material, adapted to underlie between the peak of the arch of the wearers foot and extending toe wards of but short of the ball of the wearer's foot. Additionally the insole board has a hollow or opening or cutout adapted to underlie the ball of the wearer's foot wherein a metatarsal pad made of a resiliently deformable material such as a polymer foam or gel material is inserted and fastened into the cutout in the insole board to provide more comfort, facilitate bending of the foot, and also to provide padding or cushioning at the ball of the foot and forefoot, wherein these elements combine to provide increase comfort and improve or enhance the wearer's gait.

In yet another embodiment of the disclosure an insole board for a high heel shoe comprises a rigid molded insole board having a concave heel cup adapted to underlie the heel of the wearer, wherein the heel cup is padded or cushioned with a resiliently deformable material having a durometer in the range of 28-32 on the Shore C scale, and the medial arch support comprises domed or contoured element formed of a firm but resiliently deformable material having a durometer in the range of 28-32 on the Shore C Scale, adapted to underlie between the peak of the arch of the wearer's foot and extending toe ward but short of the ball of the wearer's foot. Additionally, the insole board has a hollow or opening or cutout adapted to underlie the fore foot for additional flexibility having a firm but resiliently deformable material having a durometer in the range of 25 to 30 on the Shore C scale. Under the foot and proximal to the metatarsals, wherein a metatarsal pad made of a resiliently deformable material having a durometer in the range of 28 to 32 on the Shore C scale, is inserted and fastened onto the insole board, via sewing, bonding, gluing or friction fit, to provide support for the transverse arch of the fore foot, and also provide padding or cushioning of the ball of the foot wearer, whereby to enhance the wearers gait. The combination of contour and padding of the insole board provides increased foot surface area contact with the insole board and tilts the foot back reducing forefoot pressure.

In one embodiment of the disclosure, wherein the medial arch support comprises a firm but resiliently deformable material in the form of a dome having chamfered edges.

In a another embodiment of the disclosure, the medial arch support is bonded or glued to the foot supporting surface of the insole board, or a liner overlapping the insole board.

In another embodiment of the disclosure, the metatarsal pad is fastened onto the insole board via bonding, gluing or friction fit.

In yet another embodiment of the disclosure, the foot supporting surface of the insole board is covered, at least in part with a resiliently deformable material.

In still yet another embodiment of the disclosure, the insole board is covered at least in part with a liner formed of natural leather or synthetic material.

In yet another embodiment of the disclosure, the insole board is covered at least in part with natural leather or synthetic material which extends from the heel to the medial arch support area of the insole board, or which extends from the heel toeward but short of the ball of the wearer's foot.

In still another embodiment of the disclosure, the insole board is formed of an injection molded polymer material, preferably polypropylene, and the metatarsal pad is formed of a low density ethyl vinyl acetate.

The present disclosure also provides a shoe having an insole board described above.

BRIEF DESCRIPTION OF THE DRAWINGS

Further features and advantages of the present invention will be seen from the following detailed description, taken in conjunction with the accompanying drawings, wherein.

DETAILED DESCRIPTION

Figure 1:
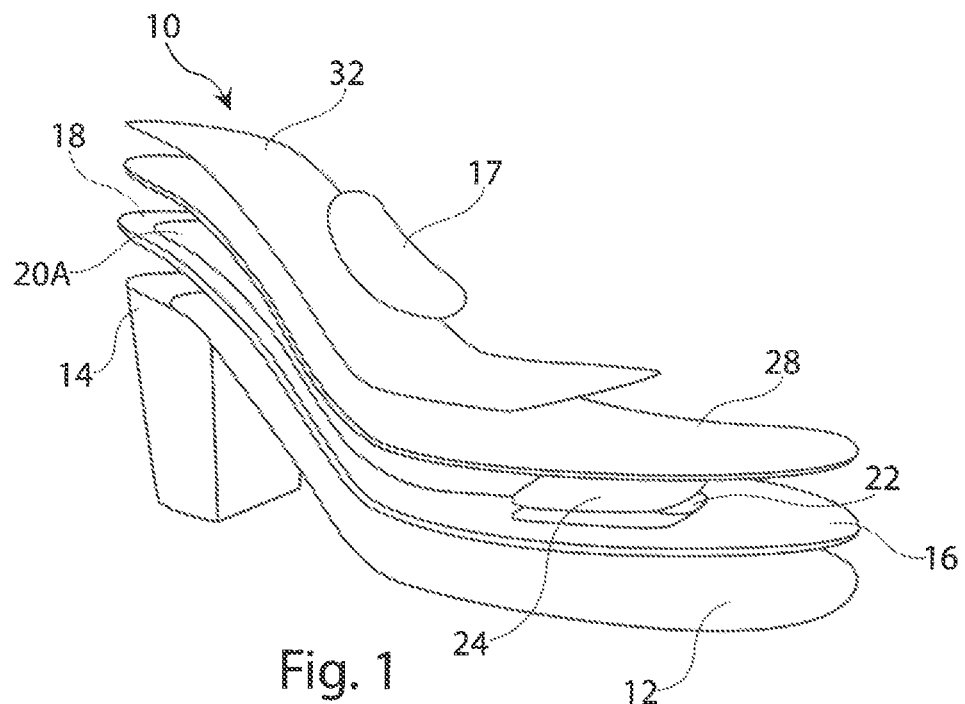
FIG. 1 is an exploded perspective view of a footwear product made in accordance with time present disclosure.
Figure 2:
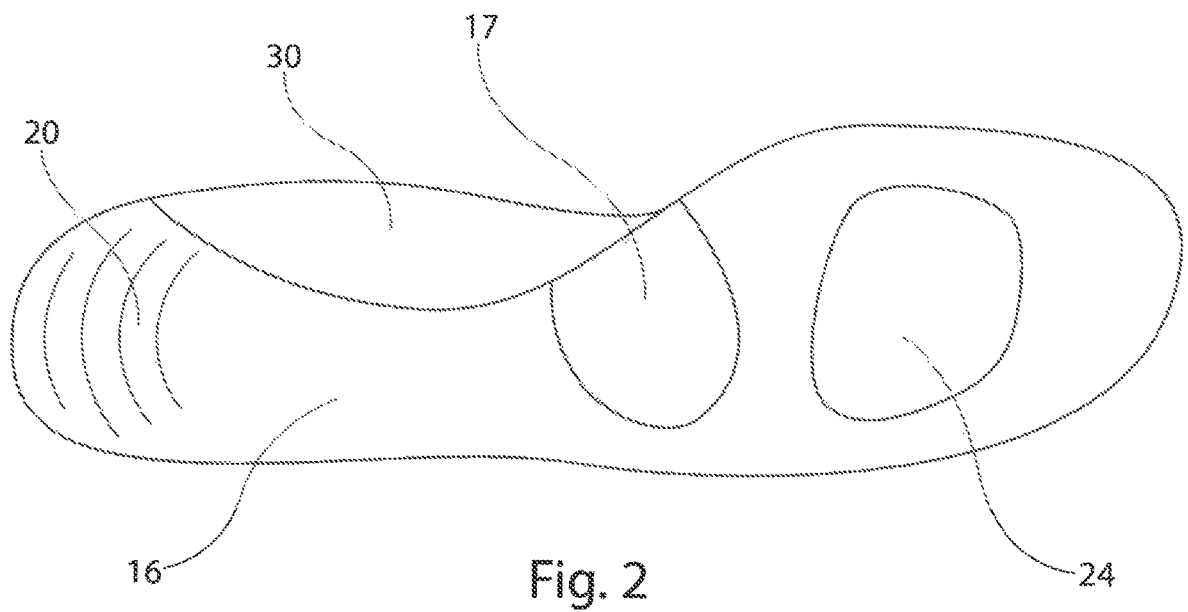
FIG. 2 is a top view of the insole board of FIG. 1.

Referring to FIGS. 1 and 2 of the drawings, there is illustrated a high-heel shoe made in accordance with the present disclosure. To facilitate the disclosure, the shoe side walls, toe box and back wall, etc., have been removed, and only the outsole and heel, insole board and insole or sock liner are illustrated. The illustrated footwear product 10 is in the form of a woman's high heel shoe, and includes an outsole 12 with an 80 mm heel 14. An insole board 16 overlies the OUTsole 12. Insole board 16 preferably is formed of a relatively rigid molded material such as polypropylene, and optionally may include a steel shank (not shown).

Insole board 16 has a generally biomechanical contour to closely approximate the contour of the bottom or sole of a human foot and includes a heel support area 18 having a concave heel cup 20 configured to underlie and support the heel of the wearer. Heel cup 20 may be padded or cushioned with a resiliently deformable material, said resiliently deformable material preferably having a durometer in the range of 28-32 on the Shore C scale. Insole board 16 also includes a hollow or cut out area 22 in the forefoot area configured to underlie the heads of the metatarsals of the wearer's foot. A plug or insert 24 formed of a resiliently deformable low density material such as low density ethyl vinyl acetate (EVA) is provided in cut out 22. Plug or insert 24 is fastened into the cutout 22, via sewing, bonding or gluing to the insole board. 16, or captured and friction fit in the cut out in insole board 16 between outsole 12 and a foam liner 28, as will be described below, and provides easy bending of the foot, as well as padding or cushioning of the ball of the foot of the wearer.

Referring in particular to FIG. 2, medial support arch pad 30 is affixed directly or indirectly to insole board 16, i.e., over sock liner or insole 32, and configured to underlie the arch of the wearer's foot, extending toeward of but short of the metatarsal heads of the wearer. Medial arch pad 30 comprises a contoured pad with a chamfered edge having a thickness at its thickest point of about 3 mm. Medial arch pad 30 is attached, e.g., by glue, to the insole board 16, or sock liner 32, and is adapted to underlie between the peak of the arch of the wearers foot and extend toe wards of but short of the ball of the wearers foot. The medial arch pad 30 preferably is of a firm but resiliently deformable material having a hardness in a range between 28-32 measured on the Shore C scale and is between 2 mm and 4 mm thick. Alternatively, medial arch pad 30 may be formed integrally with the insole board 16. However, forming medial arch pad 30 as a separate element is preferred since firmness may be controlled. Metatarsal pad 17 comprises a contoured pad with a Chamfered edge having a thickness at its thickest point of about 3 mm and a shore C value of 28-32.

Metatarsal pad 17 is attached, e.g., by glue, to the insole board 16 and is adapted to underlie between the $2^{nd}$ to $4^{th}$ metatarsals of the wearer when the shoe is worn.

Immediately overlying insole board 16 is a shock absorbing foam liner 28. Foam liner 28 typically comprises a resiliently deformable foam having a material hardness of 28-32° durometer (measured on the Shore C scale), Overlying foam liner 28 is sock liner or insole 32, which may be formed of leather, artificial leather, i.e., plastic, or fabric. Sock liner or insole 32 may comprise a full-length insole, a three quarter insole as shown in FIG. 1, or half insole 32A as shown in FIG. 3.

The biomechanical shape of the foot supporting surface of the shoe including the heel cup 20, medial arch pad 30 and the dynamic support provided by resiliently deformable plug 24 in cutout 22, improves the wearers transfer of weight from heel to toe off the ground by spreading the load more evenly across the insole, thereby improving comfort and enhancing the gait of the wearer when walking. Moreover, the contour and padding of the insole board that is relatively stiff, yet flexible, provides increased foot surface area contact for the wearer. The molded insole board 16, covered with one or more foam layers 28, and a leather or fabric layer 32, assembled into a finished shoe.

Figure 3:
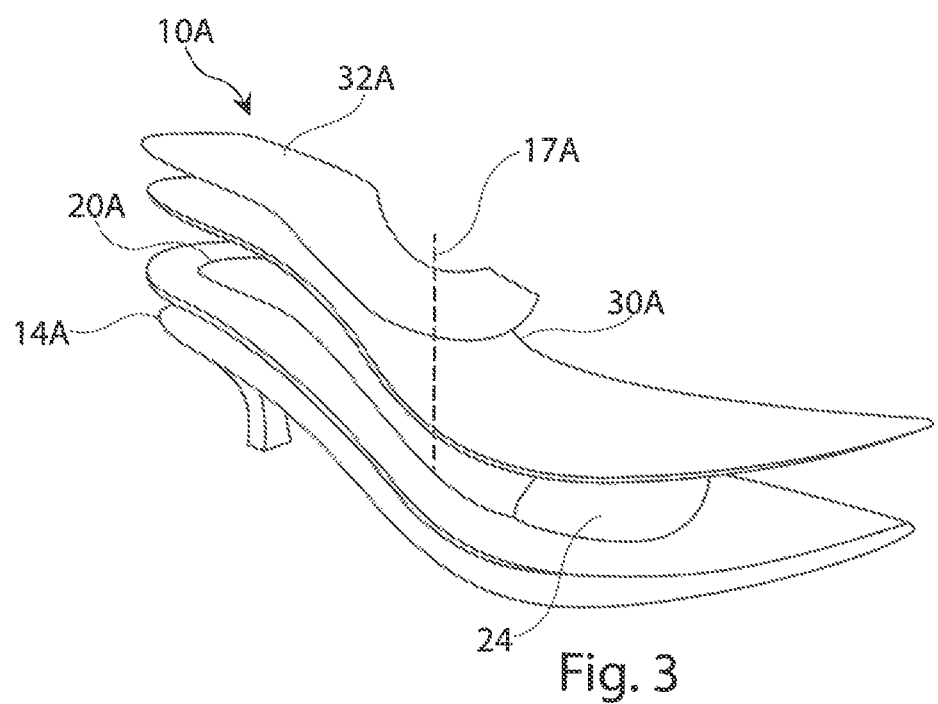
FIG. 3 is a view, similar to FIG. 1, of another footwear product made in accordance with the present disclosure.

FIG. 3 is similar to FIG. 1, and shows a high heel shoe 10A with a 50 mm heel 14A. The FIG. 3 shoe is similar in concept and construction to the shoe shown in FIG. 1, except the slope from the heel cup 20A to the medial arch 30A pad is lower.

As will be appreciated, the insole board construction of the present disclosure provides a foot supporting structure that is biomechanically and dynamically matched to the foot of the wearer, distributing pressure more evenly, to improve the wearer's gate. Moreover, the concave heel cup in combination with the medial arch support pad helps shift weight off the toes of the wearer onto the heel, and the fore foot pad under the ball of the foot of the wearer cushions the ball of the foot, particularly during toe off.

The disclosed invention is not meant to be limited by the number or order of the various materials and layers as one or more padding layers may be used to achieve the desired effect and the manufacturing processes described are not meant to limit the invention in any way as there many ways to manufacture and assemble the disclosed components of the invention.

The invention claimed is:

1. An insole hoard for a high-heel shoe, said insole board comprising a heel supporting area having a concave heel cup adapted to underlie a heel of the wearer, a medial arch support area adapted to underlie the arch of the wearer's foot and extending toeward of but short of the ball of the wearer's foot, and a forefoot area adapted to underlie the ball of the foot and forefoot of the wearer, wherein the medial arch support area has a raised contoured element formed of a firm but resiliently deformable material having a durometer of 28-32 on the Shore C scale adapted to underlie between a highest point of the arch of the wearer's foot between the $2^{nd}$ to $4^{th}$ metatarsals of the wearer's foot and extending toewards of but terminating short of the ball of the wearer's foot, and the forefoot support area includes a cut out filled with a plug of a resiliently deformable material having a durometer of 28-32 on the Shore C scale, adapted to underlie the heads of the metatarsals of the wearer's foot.

2. The insole hoard of claim 1, wherein the concave heel cup further includes a padding or cushion formed of a resiliently deformable material.

3. The insole board of claim 2, wherein the concave heel cup is padded or cushioned with a resiliently deformable material having a durometer in the range of 28-32 on the Shore C scale.

4. The insole board of claim 1, wherein the raised contoured element is bonded or glued directly to a foot supporting surface of the insole board.

5. The insole board of claim 1, wherein the raised contoured element is fastened onto the insole board via sewing, bonding, gluing or friction fit.

6. The insole board of claim 1, wherein the foot supporting surface of the insole board is covered, at least in part with a resiliently deformable foam liner.

7. The insole board of claim 6, wherein the resiliently deformable foam liner is covered at least in part with a natural leather or synthetic material liner.

8. The insole board of claim 7, wherein the natural leather or synthetic material liner extends from the heel to the medial arch support area of the insole board.

9. The insole board of claim 7, wherein the leather or synthetic liner extends from the heel toeward but short of the ball of the wearer's foot.

10. The insole board of claim 7, wherein the medial arch support area contoured element is mounted to the insole board, and is covered by the leather or synthetic liner.

11. The insole board of claim 1, Wherein the insole board is formed of an injection molded polymer material.

12. The insole board of claim 11, wherein the injection molded polymer material comprises polypropylene.

13. The insole board of claim 1, wherein the raised contoured element is formed of a low density ethyl vinyl acetate.

14. A shoe comprising an insole board as claimed in claim 1.

* * * * *